US010890445B2

(12) United States Patent
Nagori et al.

(10) Patent No.: US 10,890,445 B2
(45) Date of Patent: *Jan. 12, 2021

(54) GROUND PLANE ESTIMATION IN A COMPUTER VISION SYSTEM

(71) Applicant: Texas Instruments Incorporated, Dallas, TX (US)

(72) Inventors: Soyeb Nagori, Bangalore (IN); Poorna Kumar, Bangalore (IN); Manu Mathew, Bangalore (IN); Prashanth Ramanathpur Viswanath, Bangalore (IN); Deepak Kumar Poddar, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 53 days.

This patent is subject to a terminal disclaimer.

(21) Appl. No.: 16/185,256

(22) Filed: Nov. 9, 2018

(65) Prior Publication Data

US 2019/0078880 A1  Mar. 14, 2019

Related U.S. Application Data

(63) Continuation of application No. 15/255,832, filed on Sep. 2, 2016, now Pat. No. 10,156,441.

(30) Foreign Application Priority Data

Jan. 5, 2016  (IN) .............................. 201641000375

(51) Int. Cl.
   *G01C 3/08*  (2006.01)
   *G06T 7/73*  (2017.01)
   (Continued)

(52) U.S. Cl.
   CPC ................ *G01C 3/08* (2013.01); *B60R 11/04* (2013.01); *G01C 5/00* (2013.01); *G01C 21/26* (2013.01);
   (Continued)

(58) Field of Classification Search
   CPC . G01C 3/08; G01C 5/00; B60R 11/04; G06K 9/00791; G06K 9/623; G06T 7/579;
   (Continued)

(56) References Cited

U.S. PATENT DOCUMENTS 8,339,454 B1  12/2012  Maali
9,256,791 B2   2/2016  Stein et al.
(Continued)

OTHER PUBLICATIONS

Mihir Mody et al, "High Performance Front Camera ADAS Applications on Ti's TDA3X Platform", 2015 IEEE 22nd International Conference on High Performance Computing (HiPC), Dec. 16-19, 2015, Bangalore, KA, India, pp. 456-463.
(Continued)

*Primary Examiner* — Katrina R Fujita
(74) *Attorney, Agent, or Firm* — Ebby Abraham; Charles A. Brill; Frank D. Cimino (57) ABSTRACT

Estimation of the ground plane of a three dimensional (3D) point cloud based modifications to the random sample consensus (RANSAC) algorithm is provided. The modifications may include applying roll and pitch constraints to the selection of random planes in the 3D point cloud, using a cost function based on the number of inliers in the random plane and the number of 3D points below the random plane in the 3D point cloud, and computing a distance threshold for the 3D point cloud that is used in determining whether or not a 3D point in the 3D point cloud is an inlier of a random plane.

18 Claims, 6 Drawing Sheets

(51) Int. Cl.

| | | |
|---|---|---|
| *G06T 7/77* | (2017.01) | |
| *G06T 7/579* | (2017.01) | |
| *B60R 11/04* | (2006.01) | |
| *G01C 5/00* | (2006.01) | |
| *G01C 21/26* | (2006.01) | |
| *G06K 9/00* | (2006.01) | |
| *G06K 9/62* | (2006.01) | |

(52) U.S. Cl.
CPC ......... *G06K 9/00791* (2013.01); *G06K 9/623* (2013.01); *G06T 7/579* (2017.01); *G06T 7/73* (2017.01); *G06T 7/77* (2017.01); *G06T 2207/10028* (2013.01); *G06T 2207/20076* (2013.01); *G06T 2207/30244* (2013.01); *G06T 2207/30252* (2013.01)

(58) Field of Classification Search
CPC ... G06T 7/73; G06T 7/77; G06T 2207/10021; G06T 2207/20028; G06T 2207/20076; G06T 2207/30244; G06T 2207/30252
See application file for complete search history.

(56) References Cited

U.S. PATENT DOCUMENTS

| 9,892,328 B2 | 2/2018 | Stein et al. |
|---|---|---|
| 2009/0243889 A1 | 10/2009 | Suhr et al. |
| 2010/0079590 A1 | 4/2010 | Kuehnle et al. |
| 2010/0316257 A1 | 12/2010 | Xu et al. |
| 2014/0037136 A1 | 2/2014 | Ramalingam et al. |
| 2014/0078258 A1 | 3/2014 | Chandraker et al. |
| 2017/0076459 A1 | 3/2017 | Plowman |
| 2017/0206674 A1 | 7/2017 | Westerhoff et al. |
| 2018/0088597 A1 | 3/2018 | Shen |
| 2018/0144555 A1 | 5/2018 | Ford et al. |

OTHER PUBLICATIONS

Johannes Grater, et al, "Robust Scale Estimation for Monocular Visual Odometry using Structure from Motion and Vanishing Points", 2015 IEEE Intelligent Vehicles Symposium (IV), Jun. 28-Jul. 1, 2015, Seoul, Korea, pp. 175-479.

Manolis Lourakis and Xenophon Zabulis, "Accurate Scale Factor Estimation in 3D Reconstruction", International Conference on Computer Analysis of Images and Patterns, York, UK, Aug. 27-29, 2013, pp. 498-506.

Konstantinos G. Derpanis, "Overview of the RANSAC Algorithm", Technical Report, Version 1.2, York University, Toronto, CA, May 13, 2010, pp. 1-2.

Davide Scaramuzza et al, "Absolute Scale in Structure from Motion from a Single Vehicle Mounted Camera by Exploiting Nonholonomic Constraints", 2009 IEEE 12th International Conference on Computer Vision, Sep. 29-Oct. 2, 2009, Kyoto, Japan, pp. 1413-1419.

Shiyu Song and Manmohan Chandraker, "Robust Scale Estimation in Real-Time Monocular SFM for Autonomous Driving", 2014 IEEE Conference on Computer Vision and Pattern Recognition, Jun. 23-28, 2014, Columbus, OH, pp. 1566-1573.

"TDA3x SoC Processors for Advanced Driver Assist Systems (ADAS) Technical Brief", Texas Instruments, Inc., SPRT704A, Oct. 2014, Revised Oct. 2014, pp. 1-6.

Lalonde et al. "Single-view obstacle detection for smart back-up camera systems." Computer Vision and Pattern Recognition Workshops (CVPRW), 2012 IEEE computer Society Conference on. IEEE, 2012.

Santana et al. "Saliency-based obstacle detection and ground-plane estimation for off-road vehicles." International Conference on Computer Vision Systems. Springer, Berlin, Heidelberg, 2009.

Grater et al. "Robust scale estimation for monocular visual odometry using structure from motion and vanishing points." Intelligent Vehicles symposium (IV), 2015 IEEE, IEEE, 2015.

Kitt et al. "Monocular visual odometry using a planar road model to solve scale ambiguity." (2011).

Pardeiro et al. "Learning-Based Floor Segmentation and Reconstruction." ROBOT2013: First Iberian Robotics Conference. Springer, Cham, 2014.

Suriya et al. "Improved ground plane detection in real time systems using homography." Consumer Electronics (ICCE), 2014 IEEE International Conference on. IEEE, 2014.

GROUND PLANE ESTIMATION IN A COMPUTER VISION SYSTEM

CROSS-REFERENCE TO RELATED APPLICATIONS

This application is a continuation of U.S. patent application Ser. No. 15/255,832, filed Sep. 2, 2016, which claims benefit of India Provisional Patent Application No. 201641000375 filed Jan. 5, 2016, both of which are incorporated herein by reference in their entirety.

BACKGROUND OF THE DISCLOSURE

Field of the Disclosure

Embodiments of the present disclosure generally relate to a computer vision system, and more specifically relate to ground plane estimation in a computer vision system.

Description of the Related Art

A new class of embedded safety systems, referred to as advanced driver assistance systems (ADAS), has been introduced into automobiles to reduce human operation error. Such systems may provide functionality such as rear-view facing cameras, electronic stability control, and vision-based pedestrian detection systems. Many of these systems use monocular cameras and rely on computer vision processing to detect objects in the field of view of one or more cameras. Structure from motion (SfM) processing is a critical operation in such systems in order to achieve understanding of the three-dimensional environment from two-dimensional images captured by the monocular camera.

SUMMARY

Embodiments of the present disclosure relate to ground plane estimation in a computer vision system. In one aspect, a method for ground plane estimation in a three dimensional (3D) point cloud in a computer vision system is provided that includes receiving a 3D point cloud generated based on a plurality of 2D frames captured by a monocular camera, determining a distance threshold for the 3D point cloud based on an estimated height of a ground plane in the 3D point cloud, and estimating the ground plane of the 3D point cloud by performing the following for a predetermined number of iterations: identifying a random plane in the 3D point cloud from three randomly selected non-collinear 3D points in the 3D point cloud, wherein an incline of the random plane meets predetermined pitch and roll constraints, computing a cost function of the random plane, wherein the cost function is based on a number of inliers of the random plane and a number of 3D points below the random plane, wherein the distance threshold is used to determine whether or not a 3D point in the 3D point cloud is an inlier, and saving the cost function as a best cost function if the cost function is better than a previously computed cost function for a previously identified random plane.

In one aspect, a computer vision system is provided that includes a monocular camera configured to capture a plurality of two dimensional (2D) frames of a scene, and a processor configured to receive a three dimensional (3D) point cloud generated based on the plurality of 2D frames. The processor is configured to determine a distance threshold for the 3D point cloud based on an estimated height of a ground plane in the 3D point cloud, and estimate the ground plane of the 3D point cloud by performing the following for a predetermined number of iterations: identifying a random plane in the 3D point cloud from three randomly selected non-collinear 3D points in the 3D point cloud, wherein an incline of the random plane meets predetermined pitch and roll constraints, computing a cost function of the random plane, wherein the cost function is based on a number of inliers of the random plane and a number of 3D points below the random plane, wherein the distance threshold is used to determine whether or not a 3D point in the 3D point cloud is an inlier, and saving the cost function as a best cost function if the cost function is better than a previously computed cost function for a previously identified random plane.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Specific embodiments of the disclosure will now be described in detail with reference to the accompanying figures. Like elements in the various figures are denoted by like reference numerals for consistency.

As previously mentioned, structure from motion (SfM) processing is a critical operation in the computer vision processing performed in many camera-based embedded safety systems. In the real-time SfM processing of frames captured by a monocular camera, an SfM reconstruction pipeline detects and tracks two dimensional (2D) locations of interest points across sequential frames, storing the 2D locations in tracks corresponding to the interest points. For each frame processed in the pipeline, tracks are updated based on the frame content and triangulation is performed on each of the resulting tracks to generate a set of three dimensional (3D) points, which may be referred to as a 3D point cloud herein.

The goal of SfM is to recover the three dimensional (3D) environment in the field of view (FOV) of the camera. More specifically, in automotive applications, one goal of SfM is to determine the distance of objects in the FOV from a vehicle. SfM using only images can reconstruct the 3D environment only up to a scale factor that cannot be determined from the images. Without this scale factor, object distance cannot be reliably determined.

There are several known techniques for computing this unknown scale factor. Some such techniques use an external sensor such as an inertial measurement unit or a speedometer. Other such techniques use the height of the camera from the ground. In order to determine the scale factor based on the height of the camera, two things are needed: 1) the height of the camera from the ground, and 2) the ground plane in the form of scaled 3D points. Camera height, also referred to as ground height, is the distance from the camera center to the ground plane. In automotive applications, the height of the camera is trivially available because the camera is installed in a fixed location in the vehicle.

Embodiments of the disclosure provide for estimating the ground plane from a 3D point cloud. The estimated ground plane and the available camera height can then be used to determine the scale of the 3D point cloud, and thus the distances of objects detected in the scene. The ground plane estimation is based on the well-known random sample consensus (RANSAC) algorithm. In general, the RANSAC algorithm fits a model to data points when no single model fits the data points completely and there is one model that accounts for a large number of the data points. This algorithm is well suited for detection of a ground plane as a 3D point cloud has a high probability of including a lot of points that lie on the ground plane and there will also be points that lie above the ground plane.

Figure 1:
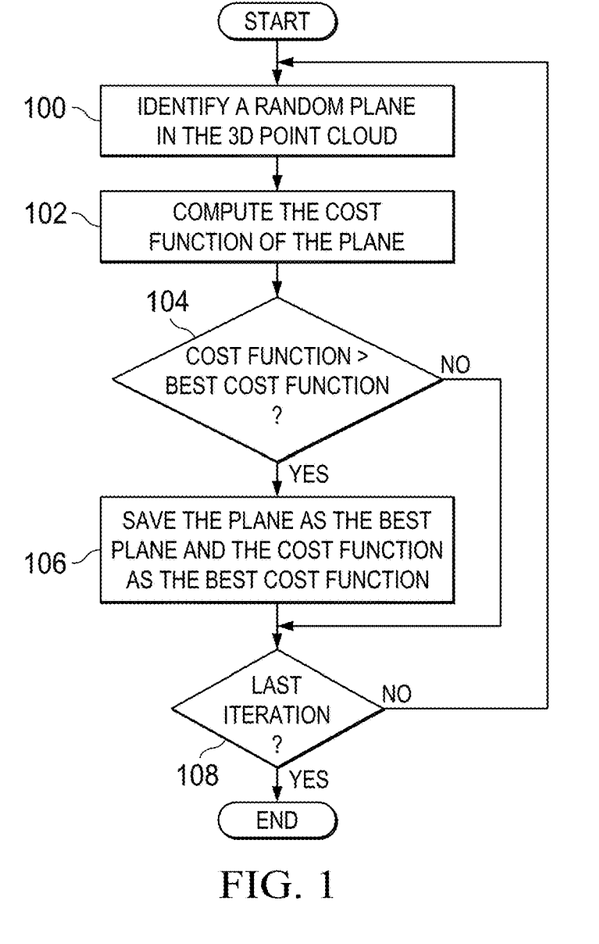
FIG. 1 is a flow diagram of a method for estimating the ground plane in a three dimensional (3D) point cloud.

FIG. 1 is a flow diagram illustrating estimating the ground plane in a 3D point cloud using RANSAC. Given a 3D point cloud, a random plane is identified 100 in the 3D point cloud. The random plane may be identified by choosing three random non-collinear points in the 3D point cloud and computing the equation of the plane that passes through the three points. A check may be made to ensure that the three randomly selected points are not the same as any previously chosen set of three points and the selection repeated if the three points match any previously selected set.

The cost function of the plane is then computed 102, i.e., the number of 3D points in the 3D point cloud on or near the plane is determined. These points are referred to as "inliers." Thus, the cost function of the plane is simply the number of inliers. In addition, the higher the cost, i.e., the higher the number of inliers, the better the plane. The determination of whether or not a 3D point is an inlier may be made by computing the distance of the 3D point from the plane and comparing that distance to a distance threshold. If the distance is below the threshold, the 3D point is determined to be an inlier.

The cost function is then compared 104 to the current best cost function to determine if the new cost function is better. If the current cost function is better, the cost function is saved 106 as the best cost function and the plane is saved as the best plane. The steps 100-108 are repeated for some predetermined number of iterations. Once all iterations have been performed, the current best plane is identified as the ground plane. The number of iterations k may be determined as per $$k = \frac{\log(1-p)}{\log(1-w^n)}$$

where p is the desired probability for finding the ground plane, w is the number of inliers divided by the total number of 3D points, and n is the number of points needed for estimating the model. For modeling a plane, n=3. Assuming that w=0.125, the minimum number of iterations needed for a 99% probability of finding the ground plane is approximately 2350.

The above algorithm may not be sufficiently robust to consistently identify the ground plane as the algorithm identifies any randomly selected plane with the largest number of inliers among the randomly selected planes as the ground plane. In other words, there is no certainty that the resulting plane is the ground plane. Embodiments of the disclosure provide modifications to the algorithm that take into consideration environmental constraints present in the automotive environment to help ensure that the plane selected with the modified algorithm is the ground plane.

Figure 2:
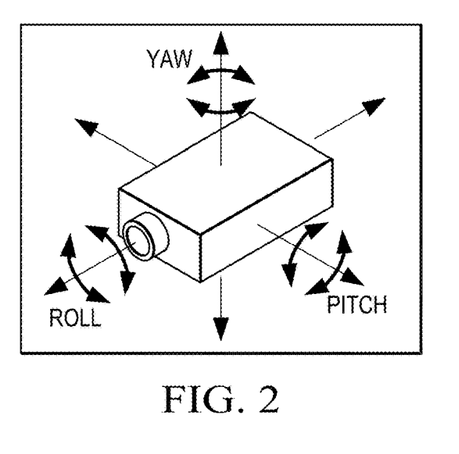
FIG. 2 is an example illustrating direction of pitch and roll of a camera.

In some embodiments, one modification to the RANSAC algorithm to help eliminate false ground plane detection is to apply pitch and roll constraints as part of the random plane selection to eliminate any random planes that do not fall within the pitch and roll constraints. FIG. 2 is an example illustrating direction of pitch and roll of a camera. The pitch and roll of a camera can be determined during calibration when the vehicle is stationary on a flat surface. These measurements form the base measurements of pitch and roll, i.e., baseRoll and basePitch, from which variations can be determined as the vehicle is moving. Neither of these measurements will be large as the axis of the camera will be nearly parallel to the ground plane. Further, when the vehicle is moving, it is typically on nearly flat surfaces, so the incline of the ground plane will be low.

When the vehicle is moving, the actual roll and pitch will vary but in a typical operation on a road, the difference between the actual roll and pitch and the baseline roll and pitch will be small. A range for variation in roll and a range for variation in pitch may be used to eliminate any randomly selected planes with inclines outside of these ranges. The roll range may be defined as [baseRoll−deltaRoll, baseRoll+deltaRoll] and the pitch range may be defined as [basePitch−deltaPitch, basePitch+deltaPitch]. The particular values of deltaRoll and deltaPitch may be implementation dependent and may be any suitable value. The values of deltaRoll and deltaPitch may be determined empirically. A typical value for these deltas may be in the range of 0.5 to 2.0 degrees. Any random planes with a pitch and roll that do not fall within these ranges may be ignored and a new random plane selected.

Figure 3:
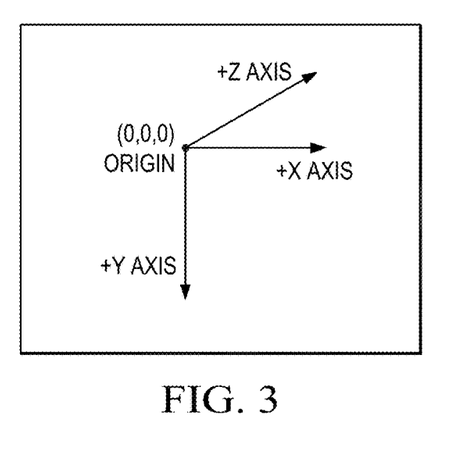
FIG. 3 is an example illustrating the axis convention for 3D points.

In some embodiments, one modification to the RANSAC algorithm to help eliminate false ground plane detection is to prune the 3D point cloud to eliminate 3D points that are likely not to be part of the ground plane. This pruning may be based on the height of the camera, i.e., any points above the height of the camera can be eliminated as such 3D points are not likely to be in the ground plane. FIG. 3 is an example illustrating the axis convention for 3D points. A right hand rule is used in which the X axis is to the right, the Y axis is down, and the Z axis is in the direction of movement, i.e., the direction in which the vehicle is moving. The origin is the camera center. Note that the Y coordinate of a 3D point increases with a decrease in height. Given that the camera pitch is not large when a vehicle is moving, the 3D points in the ground plane will have a larger Y coordinate than other 3D points in a 3D point cloud, e.g., 3D points corresponding to trees or buildings.

Figure 4:
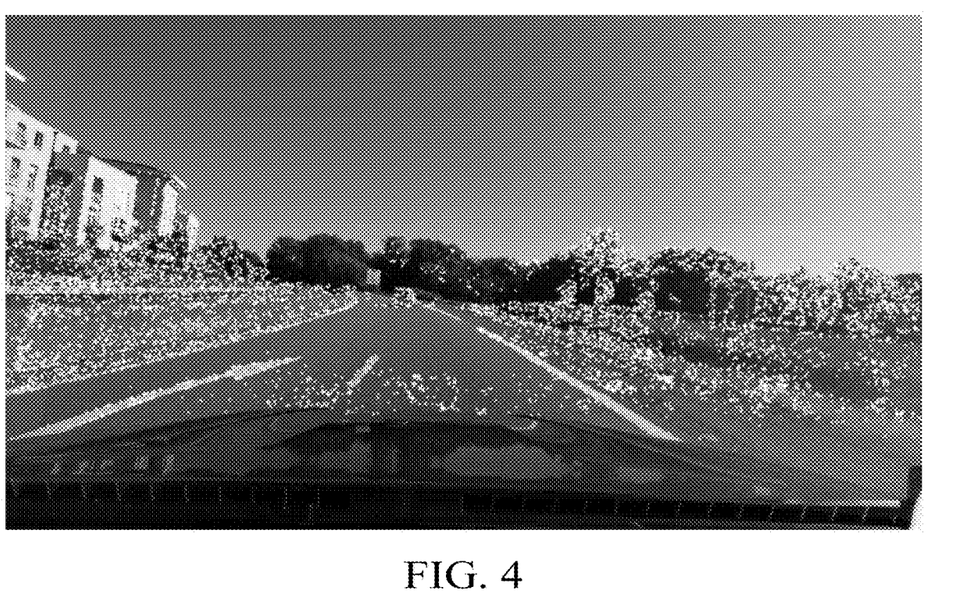
FIG. 4 and FIG. 5 are examples illustrating pruning of a 3D point cloud.
Figure 5:
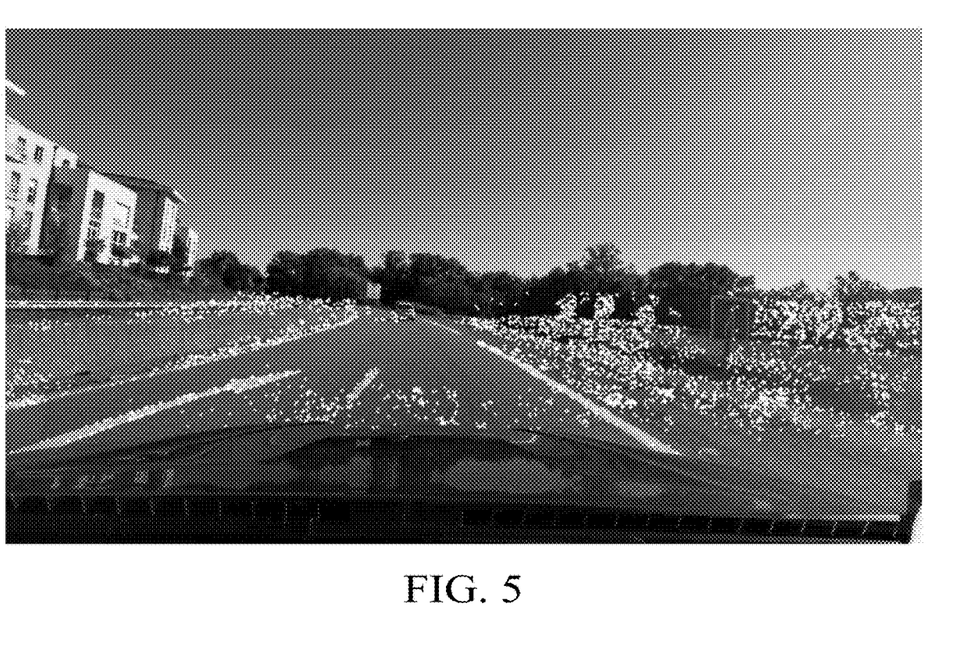

Instead of considering all 3D points in the 3D point cloud, the 3D points are sorted by Y coordinate value from highest to lowest and T % of the highest sorted 3D points are processed to determine the ground plane. The value of T is implementation dependent and may be any suitable value, which may be empirically determined. For example, if SfM is used to reconstruct the full FOV, the value of T may be in the range of 45% to 55%. If SfM uses a pre-computed region of interest (ROI) not spanning the entire FOV, the value of T may differ. FIGS. 4 and 5 are examples illustrating the effect of this pruning assuming SfM of the full FOV and T=50. FIG. 4 shows the reconstructed 3D point cloud projected onto the image without pruning and FIG. 5 shows the pruned 3D point cloud projected onto the image. FIG. 5 shows that only the 3D points below the camera are remaining in the pruned 3D cloud.

This pruning reduces the complexity of the computation as the probability of finding the ground plane depends on the number iterations. As previously described, for a given probability, the number of iterations needed to achieve that probability can be predetermined. If the number of 3D points is reduced by, e.g., 50%, the number of iterations can be reduced. For example, if T=50, then w may be increased to 0.25, thus reducing the number of iterations to approximately 300 for a 99% probability of finding the ground plane.

In some embodiments, one modification to the RANSAC algorithm to help eliminate false ground plane detection is to change the cost function to better model the ground plane. For generic plane fitting, using the number of inliers as the cost function to find the best plan is a good option. However, experiments have shown that the best plane selected by RANSAC was not the ground plane in many instances. This was due to a relatively sparse point cloud such that the ground plane was not the most dense plane, i.e., the plane with the most inliers. In many cases, planes that were some distance above the ground were incorrectly chosen as the ground plane.

Figure 6:
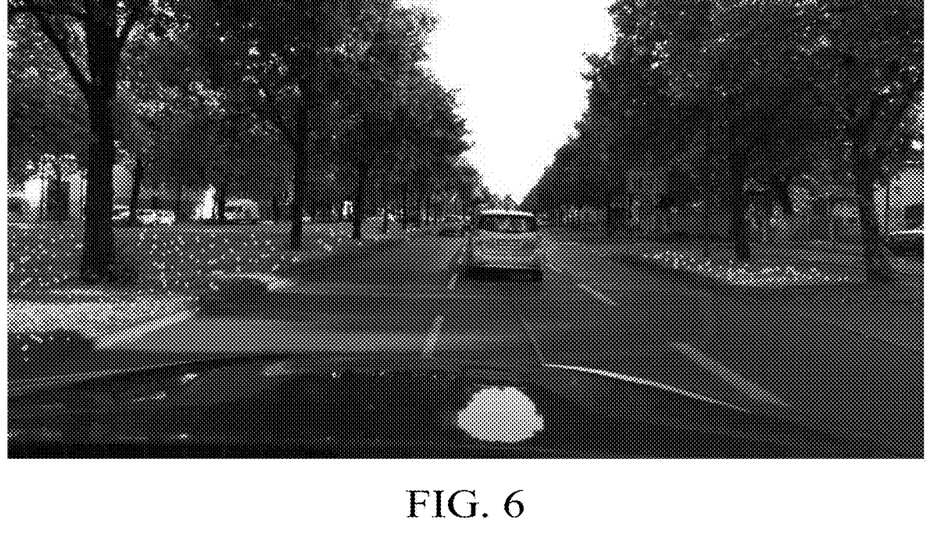
FIG. 6 and FIG. 7 are examples illustrating use of a modified cost function.
Figure 7:
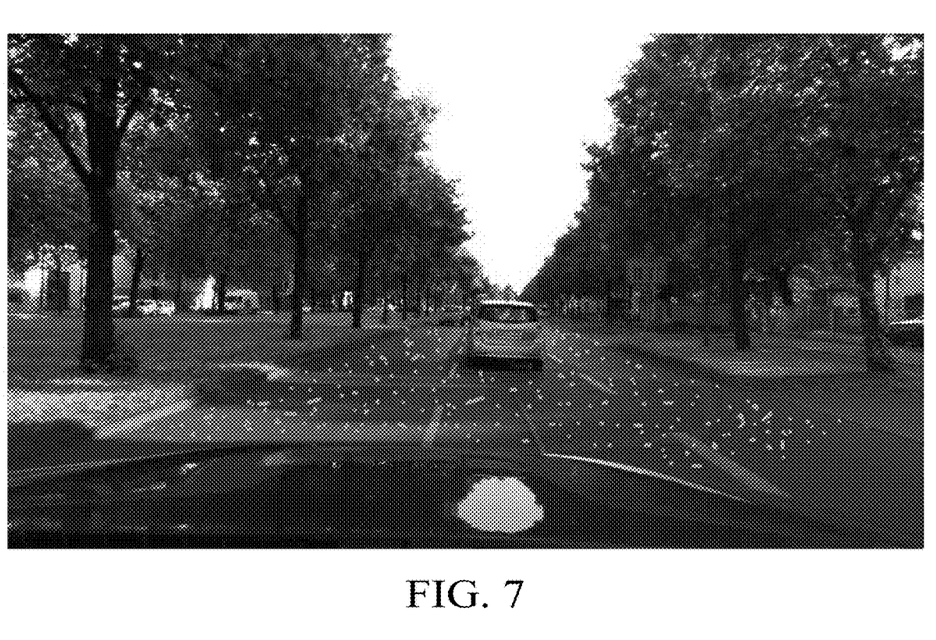

To better model the ground plane, the cost function is changed to also take into consideration the number of 3D points below the plane. That is, the cost function of a plane is the number of inliers minus the number of 3D points below the plane in the 3D point cloud. The modified cost function ensures that the plane selected as the ground plane has a low height, i.e., very few points below it, and is thus more likely to lie on the ground. FIGS. 6 and 7 are examples illustrating the effect of using the modified cost function. In FIG. 6, the use of the previous cost function resulted in the detection of the illustrated ground plane, which is above the true ground plane. In FIG. 7, the use of the modified cost function resulting in the detection of the illustrated ground plane, which is much closer to the true ground plane.

In some embodiments, one modification to the RANSAC algorithm to help eliminate false ground plane detection is to further modify the cost function to give greater weight to some of the inliers. This is based on the observation that some parts of an image are more likely to be on the ground than others. For example, the area of an image directly in front of a vehicle is more likely to be part of the ground plane than other areas of the image. Thus, such areas can be given more influence in the ground plane decision.

Figure 8:
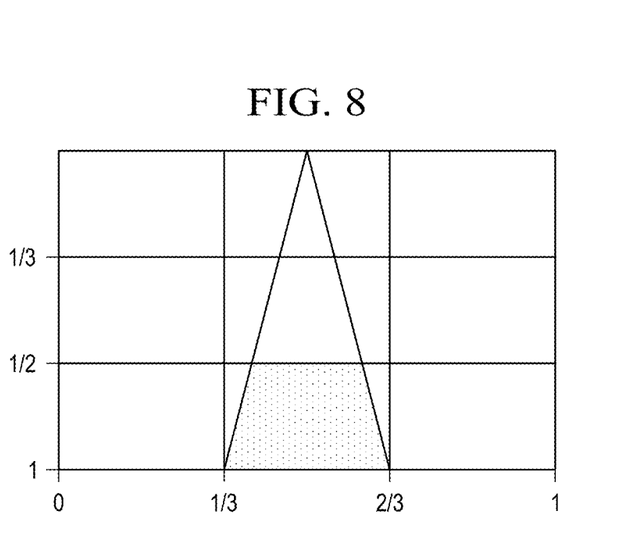
FIG. 8 is an example illustrating a trapezoidal region of an image.

The inliers to be given more weight are those 3D points that lie in a trapezoid region of an image (frame) used to generate the 3D point cloud as illustrated in the example of FIG. 8. In this example, the notations on the axes are the 2D coordinates as a fraction of the image width and height. The dimensions of the trapezoid region may be determined empirically. The 3D points that fall within this trapezoid region can be determined because the projections of the 3D points into the 2D image are known from the SfM processing. For example, the last 2D location of a track corresponding to a 3D point may be used to determine if the 3D point is in the trapezoid region. With the addition of the weight factor w, the cost function for a plane is (number of inliers outside the trapezoid−number of points below the plane outside the trapezoid)+w*(number of inliers inside the trapezoid−number of points below the plane inside the trapezoid). Any suitable value of w may be used. The value of w may be determined empirically.

Figure 9:
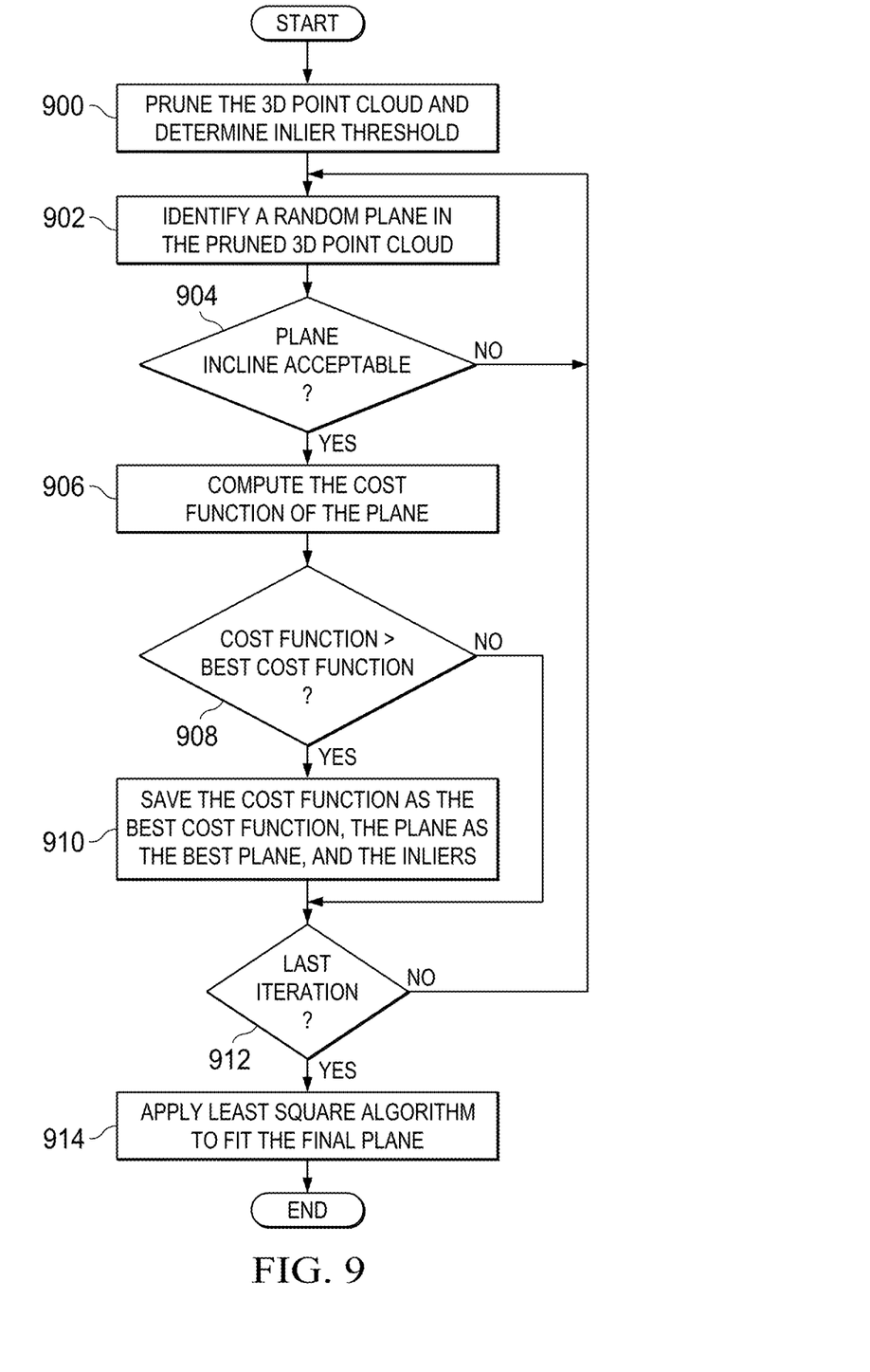
FIG. 9 is a flow diagram of a method for estimating the ground plane of a 3D point cloud.

FIG. 9 is a flow diagram of a method for estimating the ground plane of a 3D point cloud. The method is based on the RANSAC algorithm but embodiments include one or more of the previously described modifications. Given a 3D point cloud, the 3D point cloud is pruned 900 to remove 3D points not likely to be part of the ground plane. As previously described herein, the pruning may be performed by sorting the 3D points by the Y coordinate value and retaining the top T % of the sorted 3D points to be processed for estimating the ground plane. In addition, the distance threshold to be used to decide if a 3D point is an inlier of a plane is determined. Determination of this distance threshold is described below in reference to FIG. 10.

After the pruning, a random plane is identified 902 in the pruned 3D point cloud. The random plane may be identified by choosing three non-collinear random points in the pruned 3D point cloud and computing the equation of the plane that passes through the three points. While not specifically shown, a check may be made to ensure that the three randomly selected points are not the same as any previously chosen set of three points and the selection repeated if the three points match any previously selected set. A check is made to determine 904 if the incline of the random plane is acceptable, i.e., that the incline of the random plane is within the previously described camera roll and pitch ranges. This check may be performed by computing the roll and pitch of the plane and checking that the computed roll and pitch are within the camera roll and pitch ranges. If the plane incline is not acceptable 904, another random plane is identified 902 from the pruned 3D point cloud.

If the plane incline is acceptable 904, the cost function of the plane is then computed 906. As previously described herein, the cost function is based on the number of inliers of the plane. The determination of whether or not a 3D point is an inlier may be made by computing the distance of the 3D point from the plane and comparing that distance to the distance threshold determined for the 3D point cloud. If the distance is below the threshold, the 3D point is determined to be an inlier. In some embodiments, the cost function is computed as the number of inliers minus the number of 3D points below the plane in the pruned 3D point cloud as previously described herein. In some embodiments, the cost function is computed as per the weighted cost function previously described herein.

The cost function is then compared 908 to the current best cost function to determine if the new cost function is better. If the current cost function is better, the cost function is saved 910 as the best cost function, the plane is saved as the best plane, and the inliers for the plane are saved. The steps 902-912 are repeated for some predetermined number of iterations. Determination of the number of iterations is previously described herein. Once all iterations have been performed, a least squares algorithm is applied 914 to the inliers for the best plane to determine the ground plane.

Once the ground plane is estimated, the scale can be estimated based on the ground plane and the height of the monocular camera used to capture the frames used to generate the 3D point cloud. Given the scale of the 3D scene, distances and positions of objects can be estimated in standard units, e.g., meters, miles, feet.

Note that the efficacy of the above method depends on the definition of inlier. If the scale of a 3D point cloud is known, the distance between a 3D point in the cloud and any plane can be computed and a threshold based on metric distance can used to decide if the point is lying on the plane or not. In an SfM generated point cloud, the scale is an unknown quantity and distance of a point from a plane is known only up to scale. In some embodiments, a distance threshold for a 3D point cloud is determined based an estimated height of the ground plane. This estimated height, which is also referred to as the reference height, may be found by identifying 3D points in the 3D point cloud likely to be on the ground plane, finding the height of each of the identified 3D points from the ground, which is known only up to scale, and computing the threshold as a fraction of a height likely to correspond to a 3D point on the ground plane, i.e., the reference height.

Figure 10:
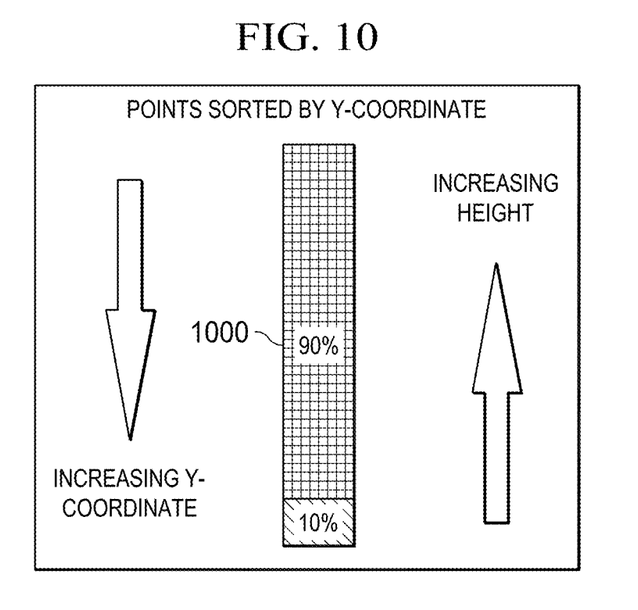
FIG. 10 is an example illustrating determination of a distance threshold for a 3D point cloud with unknown scale.

FIG. 10 is an example illustrating determination of a distance threshold for a 3D point cloud with unknown scale. To find the reference height needed to compute the distance threshold, the 3D points in the 3D point cloud are sorted 1000 by the Y coordinates. Note that in embodiments in which pruning is preformed, the same sort used for pruning may be used to find the reference height. As previously described in reference to FIG. 3, the Y coordinate of a 3D point decreases as height above the ground increases. The Y coordinate of a 3D point that lies at or close to the $90^{th}$ percentile (assuming the sort is lowest value to highest value) of the sorted 3D points is selected as the reference height. Note that the 3D point with the largest Y coordinate cannot always be assumed to lie on the true ground plane as there may be noise in the SfM reconstruction. Selecting a point that eliminates approximately 10% of points with higher Y coordinates is compensation for the effect of any noise in the SfM reconstruction.

To choose the particular percentile to be used to select the reference height, tests may be conducted using 3D point clouds with a known scale that are representative of the environment in which a vehicle will operate. The 3D points in the point clouds may be sorted by the Y coordinate and the Y coordinates at various percentiles checked across the 3D point clouds to determine what percentile most closely corresponds to a Y coordinate on the respective ground planes (assuming low pitch and roll) across the 3D point clouds.

Given the reference height, i.e., the Y coordinate of the selected 3D point, the distance threshold is computed as a fraction of the value of the Y coordinate. The particular fraction used is a target distance threshold divided by the known camera height. For example, the Y coordinate is assumed to be the height of the camera. If the target distance threshold is 10 centimeters and the known height of the camera is 1.5 meters, the threshold is 6.7% of the camera height, i.e., 10/150. Thus, the distance threshold may be computed as 6.7% of the reference height. The target distance threshold may be determined empirically.

Figure 11:
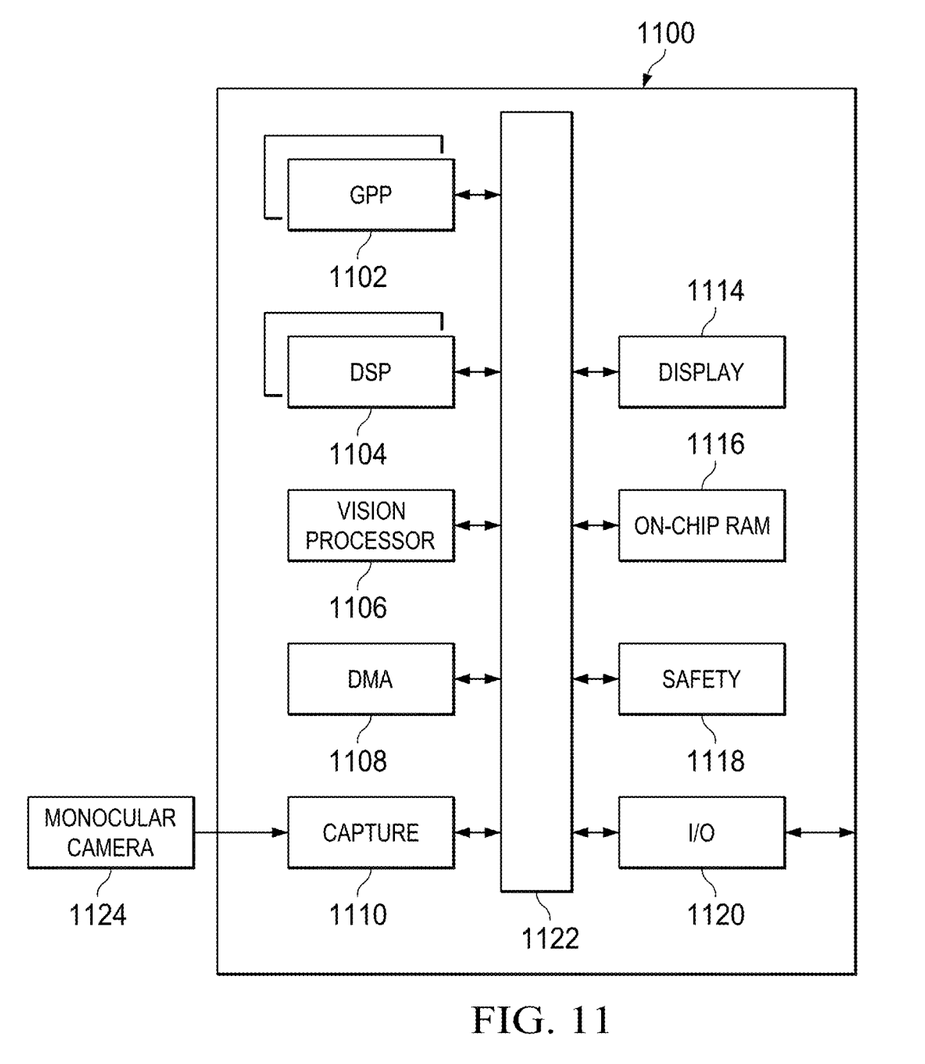
FIG. 11 is a high level block diagram of an example multiprocessor system-on-a-chip (SOC) configured for use in a monocular camera-based automotive safety application.

FIG. 11 is a high level block diagram of an example multiprocessor system-on-a-chip (SOC) 1100 configured for use in a monocular camera-based ADAS. In particular, the example SOC 1100 is an embodiment of the TDA3X SOC available from Texas Instruments, Inc. A high level description of the components of the SOC 1100 is provided herein. More detailed descriptions of example components may be found in M. Mody, et al., "High Performance Front Camera ADAS Applications on TI's TDA3X Platform," Proceedings of 2015 IEEE $22^{nd}$ International Conference on High Performance Computing, Dec. 16-19, 2015, Bangalore, India, pp. 456-463, and "TDA3x SOC Processors for Advanced Driver Assist Systems (ADAS) Technical Brief," Texas Instruments, SPRT704A, October, 2014, pp. 1-6, which are incorporated by reference herein.

The SOC 1100 includes dual general purpose processors (GPP) 1102, dual digital signal processors (DSP) 1104, and a vision processor 1106 coupled via a high speed interconnect 1122. The SOC 1100 further includes a direct memory access (DMA) component 1108, a camera capture component 1110 coupled to a monocular camera 1124, a display management component 1114, on-chip random access (RAM) memory 1116, and various input/output (I/O) peripherals 1120 all coupled to the processors via the interconnect 1122. In addition, the SOC 1100 includes a safety component 1118 that includes safety related functionality to enable compliance with automotive safety requirements. Such functionality may include support for CRC (cyclic redundancy check) of data, clock comparator for drift detection, error signaling, windowed watch-dog timer, and self testing of the SOC for damage and failures. Software implementing real-time SfM to generate 3D points clouds based on frames captured from the monocular camera 1124 and implementing an embodiment of the ground plane detection as described herein to detect ground planes in the 3D point clouds may be stored in the memory 1116 and may execute on one or more programmable processors of the SOC 1100.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which the 3D point cloud is pruned prior to searching for the ground plane. One of ordinary skill in the art will understand embodiments in which the 3D point cloud is not pruned.

In another example, embodiments have been described herein in which a distance threshold is determined for each 3D point cloud. One of ordinary skill in the art will understand embodiments in which the distance threshold is determined when the scale of a 3D point cloud may have changed.

In another example, embodiments have been described herein in which the ground plane estimation is implemented as software instructions executed on processors in a multiprocessor SOC. One of ordinary skill in the art will understand that ground plane estimation may be implemented as any suitable combination of software, firmware, and hardware. For example, some of the functionality may be implemented in one or more hardware accelerators, application specific integrated circuits (ASICs), field-programmable gate arrays (FPGAs), etc.

In another example, embodiments have been described herein in reference to automotive safety systems. One of ordinary skill in the art will understand embodiments for other computer vision applications having similar environmental constraints, such as, for example, industrial applications, robotics, and consumer applications such as vacuum cleaners.

Certain terms are used throughout the description and the claims to refer to particular system components. As one skilled in the art will appreciate, components in systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A method for ground plane estimation in a three dimensional (3D) point cloud in a computer vision system, the method comprising:
   receiving a 3D point cloud generated based on a plurality of 2D frames captured by a monocular camera;
   determining a distance threshold for the 3D point cloud based on an estimated height of a ground plane in the 3D point cloud;
   estimating the ground plane of the 3D point cloud by performing the following for a number of iterations:
      identifying a random plane in the 3D point cloud from three randomly selected non-collinear 3D points in the 3D point cloud, wherein an incline of the random plane meets pitch and roll constraints;
      computing a cost function of the random plane, wherein the cost function is based on a difference between a number of inliers of the random plane and a number of 3D points below the random plane, wherein the distance threshold is used to determine whether or not a 3D point in the 3D point cloud is an inlier; and
      saving the cost function as a best cost function if the cost function is better than a previously computed cost function for a previously identified random plane.

2. The method of claim 1, further comprising pruning the 3D point cloud prior to estimating the ground plane to eliminate 3D points not likely to be on the ground plane.

3. The method of claim 2, wherein pruning comprises sorting the 3D points in the 3D point cloud according to values of Y coordinates, and eliminating all 3D points from the 3D point cloud not included in a percentage of the sorted 3D points having the highest Y coordinate values.

4. The method of claim 3, wherein the percentage is in a range of 45% to 55%.

5. The method of claim 1, wherein computing a cost function comprises giving more weight to inliers of the random plane and 3D points below the plane that also lie in a trapezoid of a 2D frame of the plurality of 2D frames.

6. The method of claim 5, wherein computing a cost function comprises computing the cost function as (a number of the inliers outside the trapezoid−a number of 3D points below the random plane outside the trapezoid)+w*(a number of the inliers inside the trapezoid−a number of 3D points below the plane inside the trapezoid), wherein w is a weight factor.

7. The method of claim 1, wherein determining a distance threshold comprises determining a reference height for the ground plane based on 3D points in the 3D point cloud likely to be in the ground plane, and computing the distance threshold as a fraction of the reference height.

8. The method of claim 7, wherein the fraction is based on the height of the monocular camera and a target distance threshold.

9. The method of claim 7, wherein determining a reference height comprises sorting the 3D points in the 3D point cloud according to values of Y coordinates, and selecting a value of a Y coordinate of a 3D point at a percentile of the sorted 3D points as the reference height, wherein the percentile compensates for noise in the generation of the 3D point cloud.

10. A computer vision system comprising:
   a monocular camera configured to capture a plurality of two dimensional (2D) frames of a scene; and
   a processor configured to receive a three dimensional (3D) point cloud generated based on the plurality of 2D frames, the processor configured to:
      determine a distance threshold for the 3D point cloud based on an estimated height of a ground plane in the 3D point cloud; and
      estimate the ground plane of the 3D point cloud by performing the following for a number of iterations:
         identifying a random plane in the 3D point cloud from three randomly selected non-collinear 3D points in the 3D point cloud, wherein an incline of the random plane meets pitch and roll constraints;
         computing a cost function of the random plane, wherein the cost function is based on a difference between a number of inliers of the random plane and a number of 3D points below the random plane, wherein the distance threshold is used to determine whether or not a 3D point in the 3D point cloud is an inlier; and
         saving the cost function as a best cost function if the cost function is better than a previously computed cost function for a previously identified random plane.

11. The computer vision system of claim 10, wherein the processor is further configured to prune the 3D point cloud prior to estimating the ground plane to eliminate 3D points not likely to be on the ground plane.

12. The computer vision system of claim 11, wherein the processor is configured to prune the 3D point cloud by sorting the 3D points in the 3D point cloud according to values of Y coordinates, and eliminating all 3D points from the 3D point cloud not included in a percentage of the sorted 3D points having the highest Y coordinate values.

13. The computer vision system of claim 12, wherein the percentage is in a range of 45% to 55%.

14. The computer vision system of claim 10, wherein computing the cost function comprises giving more weight to inliers of the random plane and 3D points below the plane that also lie in a trapezoid of a 2D frame of the plurality of 2D frames.

15. The computer vision system of claim 14, wherein computing the cost function comprises computing the cost function as (a number of the inliers outside the trapezoid−a number of 3D points below the random plane outside the trapezoid)+w*(a number of the inliers inside the trapezoid−a number of 3D points below the plane inside the trapezoid), wherein w is a weight factor.

16. The computer vision system of claim 10, wherein the processor is further configured to determine a distance threshold by determining a reference height for the ground plane based on 3D points in the 3D point cloud likely to be in the ground plane, and computing the distance threshold as a fraction of the reference height.

17. The computer vision system of claim 16, wherein the fraction is based on the height of the monocular camera and a target distance threshold.

18. The computer vision system of claim 16, wherein determining a reference height comprises sorting the 3D points in the 3D point cloud according to values of Y coordinates, and selecting a value of a Y coordinate of a 3D point at a percentile of the sorted 3D points as the reference height, wherein the percentile compensates for noise in the generation of the 3D point cloud.

* * * * *